United States Patent [19]

Danneels

[11] Patent Number: 5,602,992
[45] Date of Patent: Feb. 11, 1997

[54] SYSTEM FOR SYNCHRONIZING DATA STREAM TRANSFERRED FROM SERVER TO CLIENT BY INITIALIZING CLOCK WHEN FIRST PACKET IS RECEIVED AND COMPARING PACKET TIME INFORMATION WITH CLOCK

[75] Inventor: Gunner Danneels, Beaverton, Oreg.

[73] Assignee: Intel Corporation, Santa Clara, Calif.

[21] Appl. No.: 159,857

[22] Filed: Nov. 29, 1993

[51] Int. Cl.⁶ .................................................. G06F 13/00
[52] U.S. Cl. ........................... 395/200.19; 370/507
[58] Field of Search ......................... 395/200, 200.01, 395/200.02, 200.04, 200.05, 200.12, 200.13, 200.17, 200.18, 200.19; 370/60, 60.1, 94.1, 95.1, 95.3, 103, 112

[56] References Cited

U.S. PATENT DOCUMENTS

| | | | |
|---|---|---|---|
| 4,748,620 | 5/1988 | Aldelmann et al. | 370/94.1 |
| 4,794,465 | 12/1988 | Van Luyt et al. | 358/341 |
| 5,253,251 | 10/1993 | Aramaki | 370/60 |
| 5,291,486 | 3/1994 | Koyanagi | 370/84 |
| 5,347,305 | 9/1994 | Bush et al. | 348/14 |
| 5,365,579 | 11/1994 | Hendrickson | 379/101 |
| 5,375,068 | 12/1994 | Palmer et al. | 370/62 |
| 5,392,223 | 2/1995 | Caci | 348/17 |
| 5,396,497 | 3/1995 | Veltman | 370/100.1 |
| 5,408,505 | 4/1995 | Mincher et al. | 370/100.1 |
| 5,428,645 | 6/1995 | Dolev et al. | 375/354 |
| 5,444,709 | 8/1995 | Riddle | 370/94.1 |

FOREIGN PATENT DOCUMENTS

| | | |
|---|---|---|
| 0059821 | 3/1981 | European Pat. Off. . |
| 0234861 | 2/1987 | European Pat. Off. . |

OTHER PUBLICATIONS

Bishop, Steven, "Mutlimedia Moves From Standalone to Networks", *LAN Times Internetworking*, Nov. 15, 1993, p. 55.

*Primary Examiner*—Thomas C. Lee
*Assistant Examiner*—Moustafa Mohamed Meky
*Attorney, Agent, or Firm*—Blakely, Sokoloff, Taylor & Zafman

[57] ABSTRACT

An apparatus and method for synchronizing multiple independent data streams in a networked computer system is disclosed. In a computer network having a plurality of computer systems coupled by a communication medium, one of the plurality of computer systems being a server system, a different one of the plurality of computer systems being a client system, a method for synchronizing a data stream transferred from the server system to the client system, the method comprising the steps of: 1) capturing information into a data packet, the capturing step being performed by the server system; 2) storing time information into the data packet, the time information indicating when the capturing step is complete; 3) transferring the data packet to the client system across the communication medium; 4) initializing a virtual server system clock if the data packet is a first data packet is the data stream; 5) retrieving the time information from the data packet; 6) comparing the time information with the virtual server system clock; and 7) processing the information in the data packet if the time information indicates a time equal to a time indicated by the virtual server system clock. The present invention further includes the steps of: 1) scheduling processing of the information in the data packet if the time information indicates a time later than a time indicated by the virtual server system clock; and 2) discarding the data packet if the time information indicates a time earlier than a time indicated by the virtual server system clock.

23 Claims, 8 Drawing Sheets

SYSTEM FOR SYNCHRONIZING DATA STREAM TRANSFERRED FROM SERVER TO CLIENT BY INITIALIZING CLOCK WHEN FIRST PACKET IS RECEIVED AND COMPARING PACKET TIME INFORMATION WITH CLOCK

BACKGROUND OF THE INVENTION

1. Field of the Invention

The present invention relates to the field of a networked computer system. Specifically, the present invention relates to the transfer and synchronization of multiple data streams across a computer network or various types of communication media.

2. Description of Related Art

In a networked computer system, it is often necessary to send multiple streams of data to a remote network site. Typically, the streams of data must be processed in the correct order and synchronized with respect to each data stream. For example, audio and video streams in a teleconferencing application must be synchronized to provide the correct relationship between the audio and video data. Conventional systems implement data streams as a plurality of data packets that can be independently transferred across a network. Currently, packetized data streams may be synchronized by interleaving the data packets that make up the streams in such a way that the packets are sent to the network in synchronized order. This interleaving method has several drawbacks. First, not all networks can guarantee an in-order delivery of data packets. The synchronization between data streams may be lost by a network that randomly delays the transfer of a data packet. Secondly, even if in-order delivery of packets is guaranteed, the interleaving method does not allow synchronization of data streams where the data stream cannot be sent in a single interleaved stream. For example, where the data streams are sent on different network channels, two different network addresses, or on different networks, the data streams cannot be sent in a single interleaved stream. In other situations, multiple originators or producers of data streams (i.e. servers) may exist on a network. In this case, data streams from a single server must be synchronized with respect to each other; but, synchronization from one server to another may not be required. In other situations it may be necessary to mix a set of data streams originated by multiple servers into one unified data stream for delivery to a client network node. For example, instead of two servers each sending an audio and video stream to a client node for processing, it may be more efficient to mix the audio signals into a unified stream which then must be synchronized with both video streams. Conventional systems are incapable of providing these multiple levels of data stream synchronization.

Thus, a better method for synchronizing multiple independent data streams in a networked computer system is needed.

SUMMARY OF THE INVENTION

The present invention is an apparatus and method for synchronizing multiple independent data streams in a networked computer system. In a computer network having a plurality of computer systems coupled by a communication medium, one of the plurality of computer systems being a server system, a different one of the plurality of computer systems being a client system, a method for synchronizing a data stream transferred from the server system to the client system, the method comprising the steps of: 1) capturing information into a data packet, the capturing step being performed by the server system; 2) storing time information into the data packet, the time information indicating when the capturing step is complete; 3) transferring the data packet to the client system across the communication medium; 4) initializing a virtual server system clock if the data packet is a first data packet is the data stream; 5) retrieving the time information from the data packet; 6) comparing the time information with the virtual server system clock; and 7) processing the information in the data packet if the time information indicates a time equal to a time indicated by the virtual server system clock. The present invention further includes the steps of: 1) scheduling processing of the information in the data packet if the time information indicates a time later than a time indicated by the virtual server system clock; and 2) discarding the data packet if the time information indicates a time earlier than a time indicated by the virtual server system clock.

It is therefore an advantage of the present invention to provide a means and method for time stamping packets of a data stream. It is a further advantage of the present invention to provide a means and method for synchronizing data streams arriving from one server and providing them to a client in the same time sequence as they were captured. It is a further advantage of the present invention to provide a data stream synchronization means and method wherein data streams may take independent paths across a network. It is a further advantage of the present invention to provide a means and method for mixing a plurality of data streams for playback in one unified stream.

These and other advantages of the present invention are fully described in the following detailed description of the preferred embodiment.

DETAILED DESCRIPTION OF THE PREFERRED EMBODIMENT

The present invention is an apparatus and method for synchronizing multiple independent data streams in a networked computer system. In the following detailed description, numerous specific details are set forth in order to provide a thorough understanding of the invention. However, it will be apparent to one of ordinary skill in the art that these specific details need not be used to practice the present invention. In other circumstances, well known structures, materials, circuits, and interfaces have not been shown or described in detail in order to not unnecessarily obscure the present invention.

Figure 1:
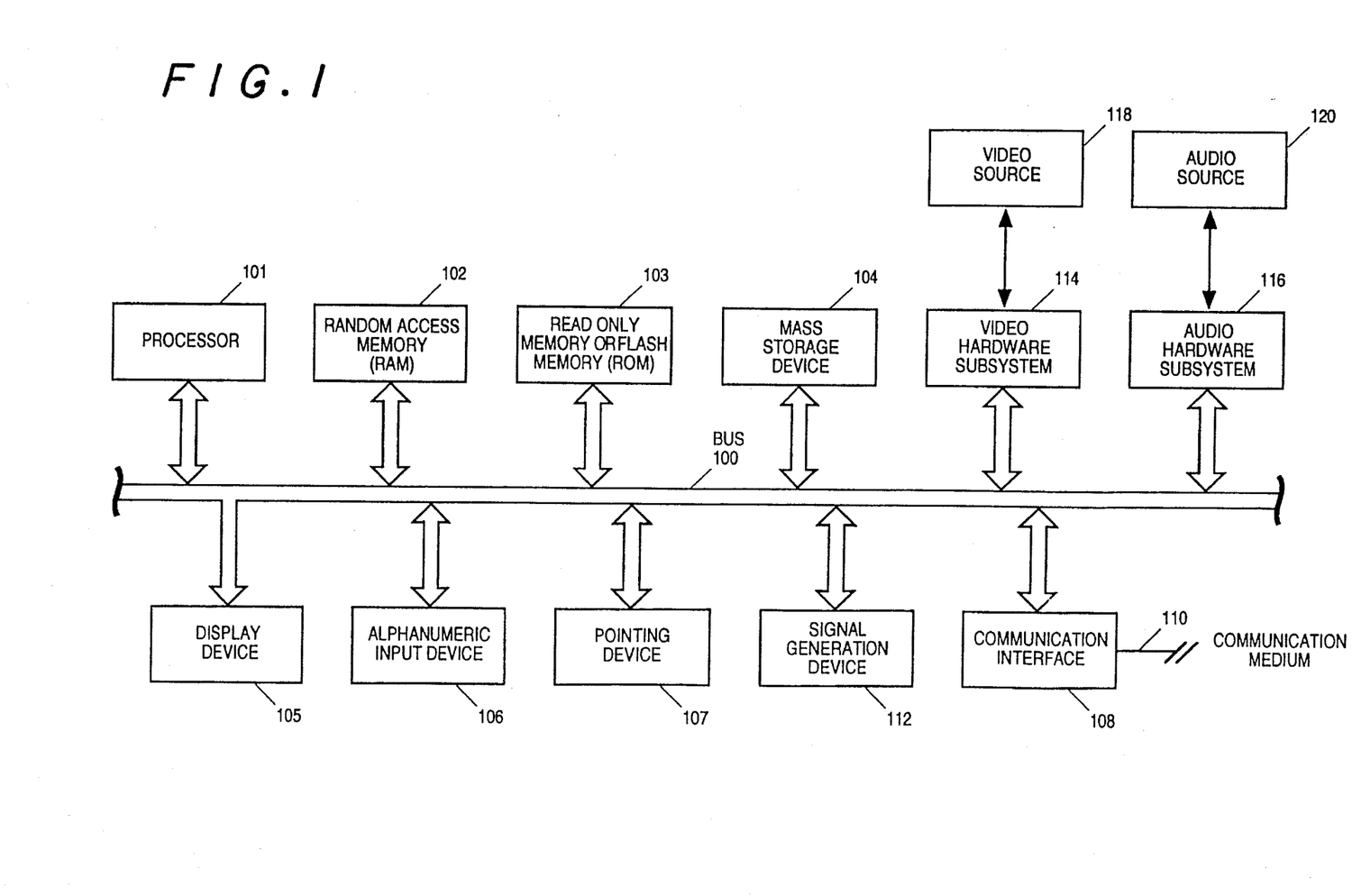
FIG. 1 is a block diagram illustrating the computer system hardware used in the preferred embodiment.

Referring now to FIG. 1, a block diagram of the computer system hardware used in the preferred embodiment is illustrated. The computer system used in the preferred embodiment comprises a Bus 100 for communicating information between computer system components. These components coupled to Bus 100 include Processor 101. Processor 101 may be implemented as any of a variety of commonly available microprocessors such as the 386 brand, i486 brand, or Pentium brand microprocessors manufactured by Intel Corporation, Santa Clara, Calif. The Intel, 386, i486, and Pentium marks are trademarks of Intel Corporation. It will be apparent of ordinary skill in the art that other equivalent processors may be used with the present invention. Other system components include Random Access Memory (RAM) 102, Read Only Memory (ROM) 103, and mass storage device or disk drive 104. The computer system of the preferred embodiment also includes a display device 105 coupled to the Bus 100 for displaying information to a computer user, an alphanumeric input device 106 coupled to the Bus 100 for communicating information and command selections to the Processor 101, a pointing device or cursor control device 107 coupled to the Bus 100 for communicating information and command selections to Processor 101, and a signal generation device 112 coupled to the Bus 100 for communicating command selections to the Processor 101. Display device 105 may be a liquid crystal device, a cathode ray tube, or other suitable display device. Alphanumeric input device 106 is typically an alphanumeric or function key keyboard. Pointing device or cursor control device 107 is typically a mouse, trackball, or stylus device allowing the computer user to dynamically signal the two dimensional movement of a visible symbol (i.e., cursor) on the display screen of display device 105. Many implementations of the cursor control device 107 are well known in the art including trackball systems, mouse systems, joy sticks, stylus, or special keys on the alphanumeric input device 106 capable of signaling movement in a given direction. Signal generation device 112 is typically implemented as a button or switch located on or near the cursor control device 107.

The computer system used in the preferred embodiment includes a communication interface 108 coupled to Bus 100. Communication interface 108 is also coupled to a communication medium 110. Communication interface 108 provides a means for the computer system to communicate with a network of other computer systems. A variety of networks or communication media are well known in the art. These communication media 110 include well known Local Area Networks (LAN) such as Ethernet, Wide Area Networks (WAN), telephone modem links, or other well known and conventional computer networking technology.

The computer system of the preferred embodiment also includes video hardware subsystem 114 and audio hardware subsystem 116 both coupled to Bus 100. A video source 118, such as a video camera or video tape player, is coupled to video hardware subsystem 114. An audio source 120, such as a microphone or audio tape player, is coupled to audio hardware subsystem 116. Video hardware subsystem 114 provides a means by which the computer system of the preferred embodiment may receive video signals and convert the video signals for transfer to other system components as a stream of digital video information via Bus 100. Similarly, audio hardware subsystem 116 provides a means by which the present invention may receive audio signals and convert the audio signals to a stream of digital audio information for transfer to other system components via Bus 100. In a similar manner, the video data streams provided by video hardware subsystem 114 and the audio data streams provided by audio hardware subsystem 116 may be transferred under control of Processor 101 to other networked computer systems via communication interface 108 and communication medium 110. The present invention provides a means and method for synchronizing these data streams in a networked computer system. Except as described herein, the configuration and interconnection of computer system components as illustrated in FIG. 1 are well known to those of ordinary skill in the art.

Figure 2:
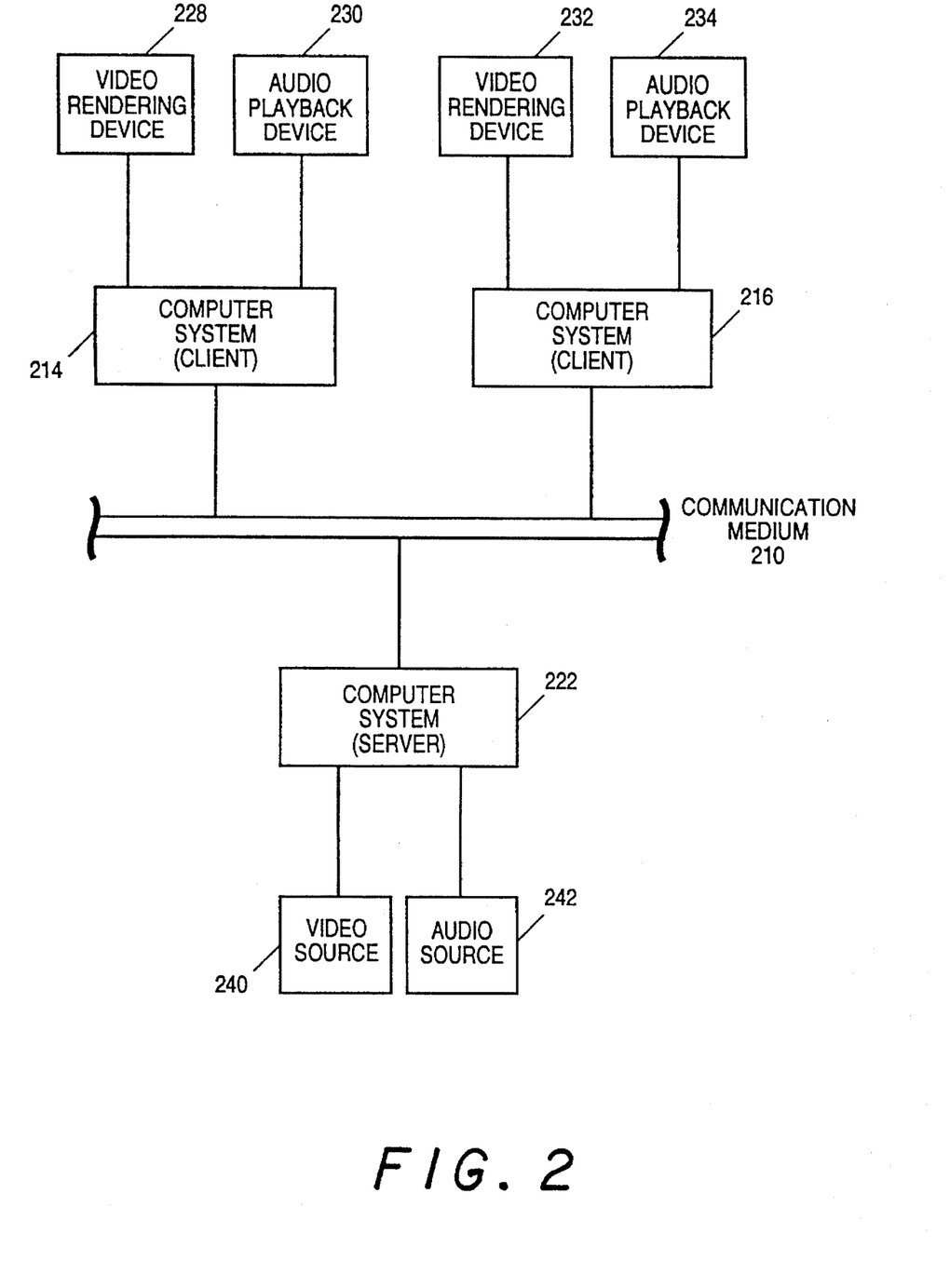
FIG. 2 illustrates a typical network environment in which the present invention operates.

Referring now to FIG. 2, a typical environment in which the present invention operates is illustrated. The present invention operates in an environment comprising a set of computer systems linked in a network topology by a communication medium 210. It will be apparent to those of ordinary skill in the art that any arbitrary number of computer systems may be so linked. In the example network environment illustrated in FIG. 2, each computer system 214, 216 and 222 is shown coupled to communication medium 210. Each of these computer systems comprise components such as those illustrated in FIG. 1. Computer systems 214 and 216 may be coupled to video rendering devices, such as a display, and audio playback devices. Computer system 222 may be coupled to a video source and an audio source. For example, computer system 214 is coupled to video rendering device 228 and audio playback device 230. Similarly, computer system 222 is coupled to video source 240 and audio source 242. It is not necessary for each computer system coupled to communication medium 210 to have video rendering devices, video sources, audio playback devices, and/or audio sources connected to them. In a variety of configurations, computer systems coupled to communication medium 210 may independently be coupled to a video source or rendering device and an audio source or playback device, a video source only, an audio source only, or neither a video source or audio source. A single video source or audio source may also be shared between two computer systems. In any of these configurations, the video source provides a stream of video data which a computer system may provide to other computer systems via communication medium 210. Similarly, an audio source provides a stream of audio data which may be provided to other computer systems via communication medium 210. It will be apparent to one of ordinary skill in the art that data types other than video or audio may equivalently be supported.

A computer system on which video or audio data steams originate is called a server for the data streams. In the example of FIG. 2, computer system 222 is a server. When acting as a server, computer system 222 receives video signals via video source 240 and audio signals via audio source 242 and converts these signals to video and audio data streams, which are provided to other computer systems via communication medium 210. These data streams are transferred on communication medium 210 by server 222 and transported to remote computer systems such as computer system 214 and 216. Any remote computer system receiving data streams from a server and rendering or playing the data to a local user is known as a client system for the data streams. Thus, in general, a server system is an originator of data streams and a client system is a receiver or consumer of data streams. The client system is responsible for synchronizing the data streams arriving from a server and for rendering the data streams to a local user in the same time sequence as the data streams were captured by the server system. It is not essential to the present invention that the data streams from the server arrive on the same network media. It is only important that the data streams are provided in some way to a client computer system via a communication medium. The client system may then synchronize the data streams and render them to a local user using the technique taught herein.

Although the example illustrated in FIG. 2 shows a single server system 222, the present invention is applicable to network environments wherein multiple servers and multiple clients exist on the network at one time. A multiple server, multiple client network configuration is illustrated in FIG. 3.

Figure 3:
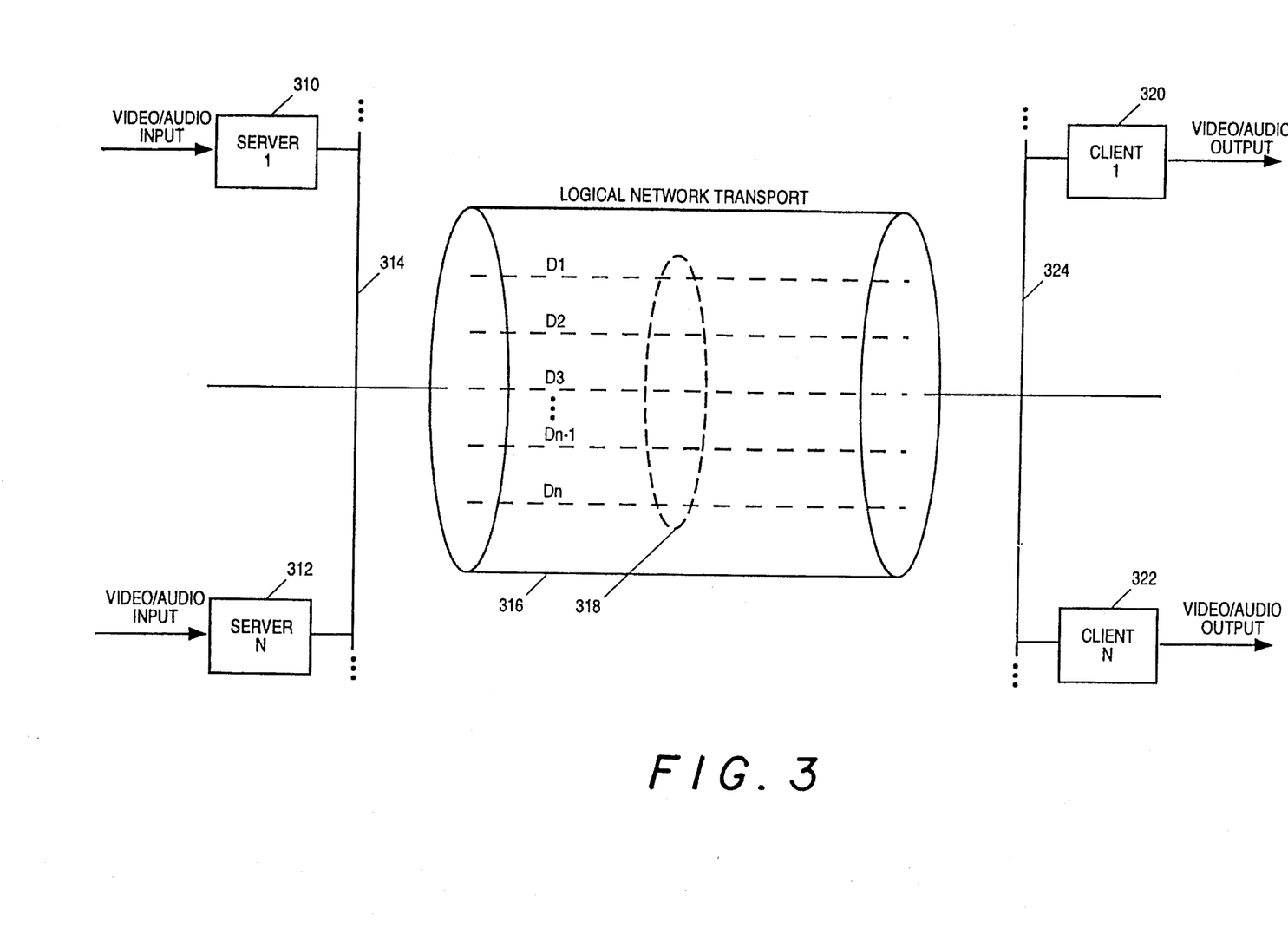
FIG. 3 illustrates a multiple server, multiple client network environment.

Referring to FIG. 3, servers 310 and 312 are coupled to clients 320 and 322 via communication medium 314, 316 and 324. A portion of network medium 316 is blown up in FIG. 3 to illustrate the multiple independent data streams 318 concurrently being transferred across network medium 316 from servers 310 and 312 to clients 320 and 322. Each data stream of data streams 318 consist of a sequence of data packets. Each data packet comprises a portion of information captured by a server system. This information may represent a captured video image, or portion thereof, a captured audio representation or any other collection of information that may be represented as binary information. In a typical implementation, the video hardware subsystem of a server system captures a video image and creates a sequence of data packets that are transferred across network 316 as one of data streams 318. Similarly, other data streams of data steams 318 are generated by other server systems. In the synchronization process of the present invention, the client system seeks to establish the same time line or synchronization for rendering the data packets as was present during the capturing of the data packets performed by the corresponding server system. In this manner, the client system is able to render information in a manner corresponding to the way the information was captured by a server system. This synchronization can occur regardless of the manner by which the information is transferred between the server and client systems. Moreover, the present invention can be used to synchronize data streams with respect to each other. In this manner, a video stream may be synchronized with an audio stream and rendered by a client system appropriately. Further details of the synchronization process of the present invention follow.

Figure 4:
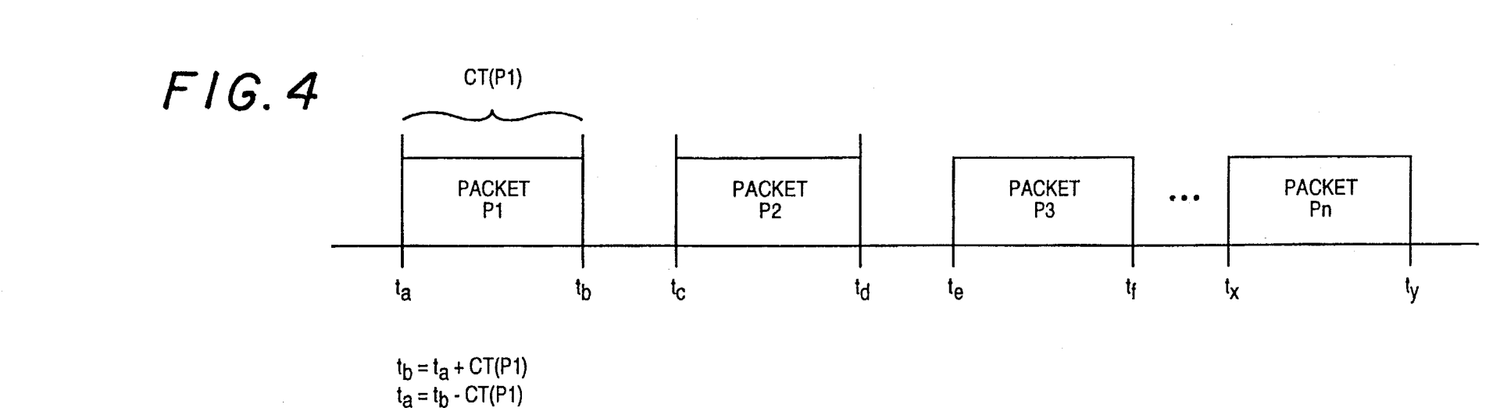
FIG. 4 illustrates a time line with associated data packets of a data stream.

Referring now to FIG. 4, data packets $P_1$ to $P_n$ are shown on a time line. Data packets $P_1$ through $P_n$ represent the data packets of a data stream such as data stream $D_1$ illustrated in FIG. 3. Each packet comprises information collected or captured during a time frame defined by a beginning capture time and an ending capture time. For example, referring to FIG. 4, packet $P_1$ comprises information captured between time $t_a$ and time $t_b$. A function CT defines the capture time for a particular packet of a data stream. As illustrated in FIG. 4, the capture time for packet $P_1$, CT ($P_1$) is defined as the time period between $t_a$ and $t_b$. In one embodiment of the present invention, the capture time for each data packet of a data stream is identical and preset to some fixed value. In an alternative embodiment of the present invention, the capture time for each data packet of a data stream may be different. Thus, function CT is used to determine the capture time for a particular data packet. As indicated by the equations in FIG. 4, the ending capture time, $t_b$, may be determined by knowing the beginning capture time, $t_a$, and the capture time CT ($P_1$). Similarly, the beginning capture time, $t_a$, may be determined if the ending capture time, $t_b$, and the capture time CT ($P_1$) is known. Similar computations may be performed for each data packet $P_1$ through $P_n$ of a data stream.

In support of the synchronization process of the present invention, a time stamp is applied to each data packet of a data stream. When a server computer system captures data into data packets, the server stamps its system clock time into each packet of the data stream. In the preferred embodiment, this time stamp represents the system clock time at the data packet ending capture time. Thus, for the example illustrated in FIG. 4, the time stamp applied to packet $P_1$ is $t_b$. The computer system clock is assumed to be a monotonically increasing count of the system clock ticks. Thus, CT ($P_1$) equals the number of system clock ticks between $t_a$ and $t_b$. Each data packet generated by a server is stamped with the ending capture time of the packet. Thus, packet $P_2$ is stamped with time $t_d$, packet $P_3$ is stamped with time $t_f$, and packet $P_n$ is time stamped with time $t_y$. In this manner, each data packet of a data stream is referenced to a unique position on a data stream time line, such as the one illustrated in FIG. 4. Each data packet is thereby associated with a fixed moment in time on the server system clock.

Figure 5:
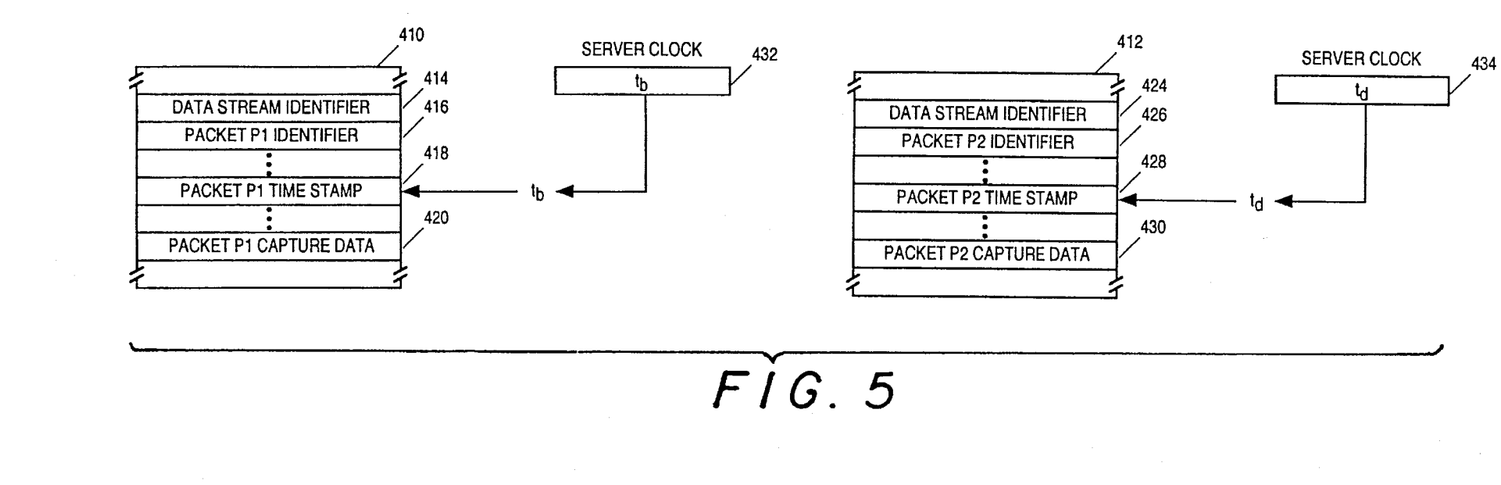
FIG. 5 illustrates the data structure of a data packet.

Referring now to FIG. 5, the data structure of two data packets 410 and 412 are illustrated. In the example of FIG. 4, data packet 410 corresponds to packet $P_1$ and data packet 412 corresponds to packet $P_2$.

Each data packet in a data stream comprises a data steam identifier 414, a packet identifier 416, a packet time stamp 418, and packet capture data 420 as illustrated in FIG. 5. Data stream identifier 414 uniquely identifies the data stream of which the data packet is a member. The data stream identifier 414 may include an encoded value representing the source of capture data 420 or the identity of the server that generated the data packet 410. It will be apparent to one of ordinary skill in the art that other means for uniquely identifying a particular data stream may be employed and encoded into data stream identifier 414. Packet identifier 416 is used to uniquely identify a particular data packet within a data stream identified by data stream identifier 414. In the preferred embodiment, packet identifier 416 is a consecutively numbered sequence integer that defines a particular data packet's relative position in a data stream relative to other data packets in the data stream. Packet time stamp 418 is a binary value corresponding to the time at which the capture of capture data 420 was completed by a server system. For the example illustrated in FIG. 4, capture for packet $P_1$ was completed at time $t_b$. Referring again to FIG. 5, the time $t_b$ is present on the server system clock 432 at the time capture is complete for packet $P_1$. During the process of building packet $P_1$, a server system captures data into region 420 of packet 410. When capture for this packet is complete, the time from server clock 432 is retrieved and stored in time stamp field 418. For the example of data packet $P_1$, the time in server clock 432 will be $t_b$. Having completed the generation of packet 410, the server system queues packet 410 for transmission across a communication medium and begins to generate the next data packet 412 in the data stream. In this case, the data stream identifier 424 will be the same as data stream identifier 414 in the previous data packet 410. Packet identifier 426 will uniquely identify data packet 412. A new set of capture data will be stored in capture data region 430. When capture for data packet 412 is complete, the server clock 434 is read and the capture complete time ($t_d$) is stored in time stamp field 428. In this manner, a server system generates a data stream of data packets with a time stamp in each data packet that defines a capture data time line for the data stream.

Figure 6:
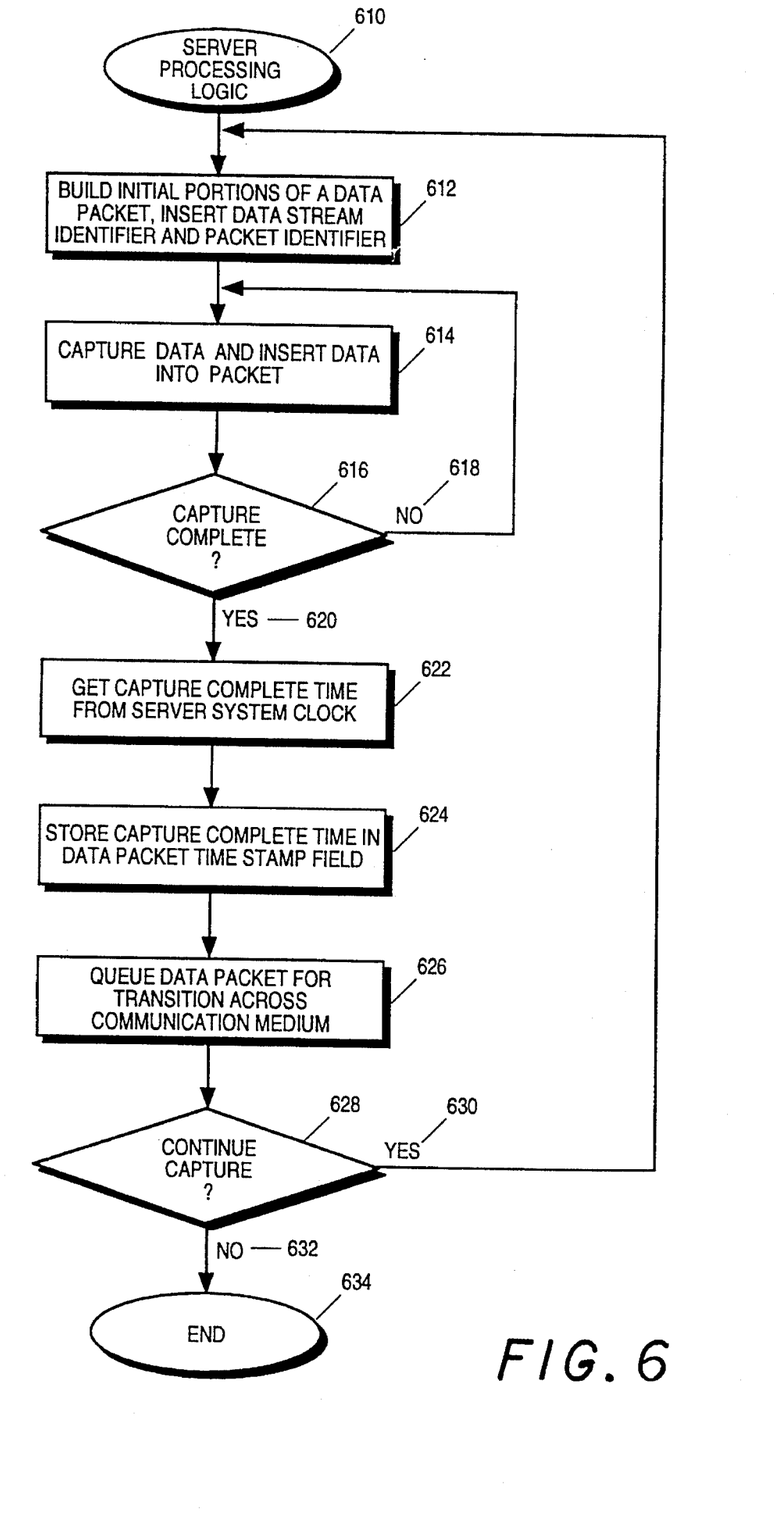
FIGS. 6 through 9 are flow charts illustrating the processing logic of the present invention.

Referring now to FIG. 6, a flowchart illustrates the processing logic of the server system. The server processing starts by building the initial portions of a data packet (processing block 612). The data stream identifier, the packet stream identifier, and any other initial fields of the data packet are filled in processing block 612. The server system captures data and inserts the data into the data packet in processing block 614. For example, digitized video information may be stored into the capture data area 420 of the data packet in processing block 614. The capture and storage of data into the data packet continues until either a predetermined time period has elapsed or the capture data area 420 of the data packet is full. When this occurs, capture is complete and processing path 620 is taken. If capture is not complete, processing path 618 is taken and the data capture process continues at processing block 614.

Once capture is complete, the capture complete time is read from the server system clock in processing block 622. The capture complete time is stored in the data packet in time stamp field 418 in processing block 624. The data packet is queued for transmission across the communication medium in processing block 626. As long as the capture process is not terminated, processing path 630 is taken to processing block 612 where a new data packet is generated. Processing for the server system terminates through processing path 632 at end bubble 634.

In the synchronization process of the present invention, the client system seeks to establish the same data packet time line for rendering the data packet that was established by the server system during the capture process. Because the transfer of data packets across the communication medium may occur at any arbitrary time or in any arbitrary sequence, the client system must rebuild the data stream into the same form and synchronization as the data stream generated by the server system.

Figure 7:
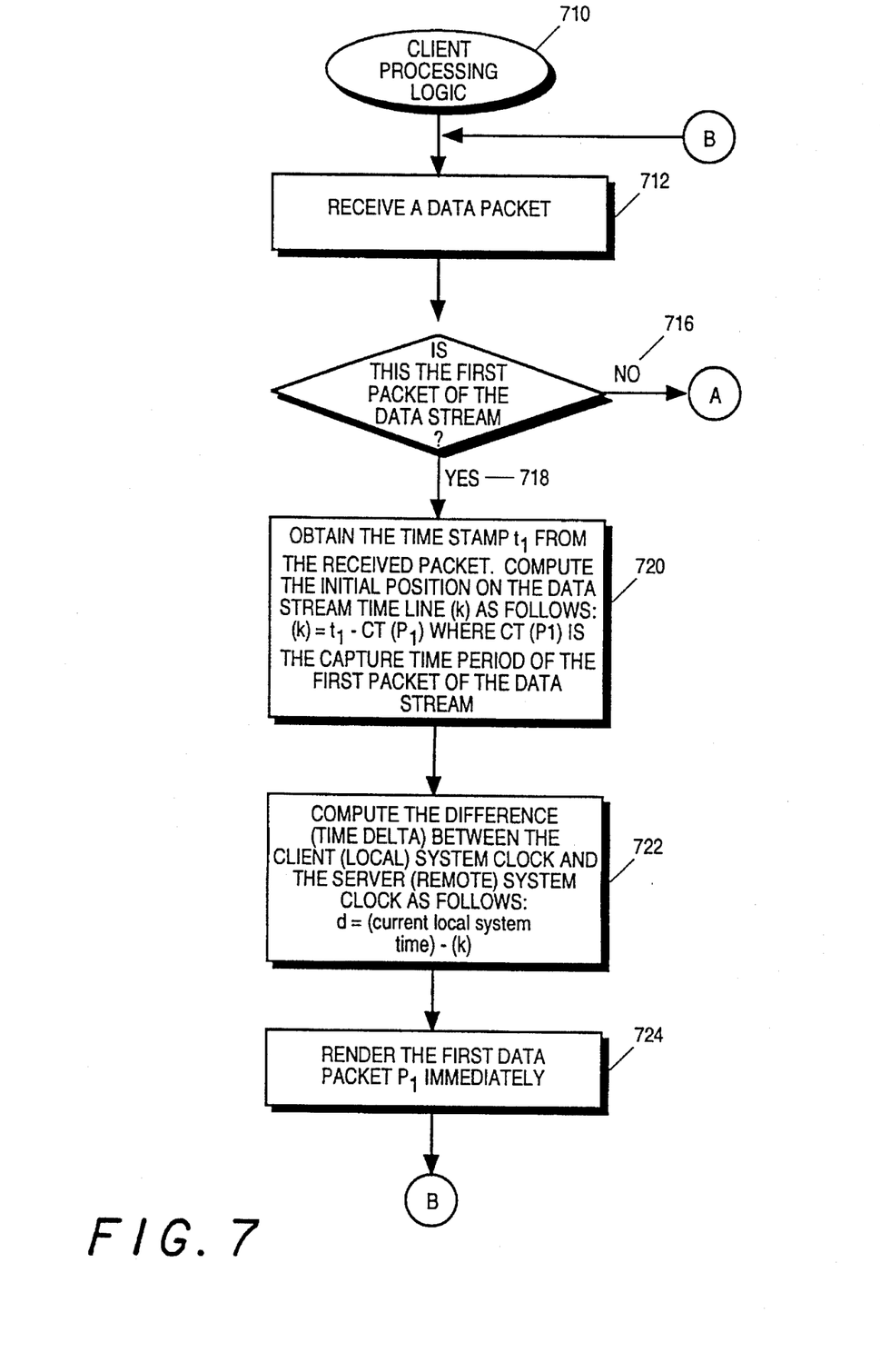
Figure 8:
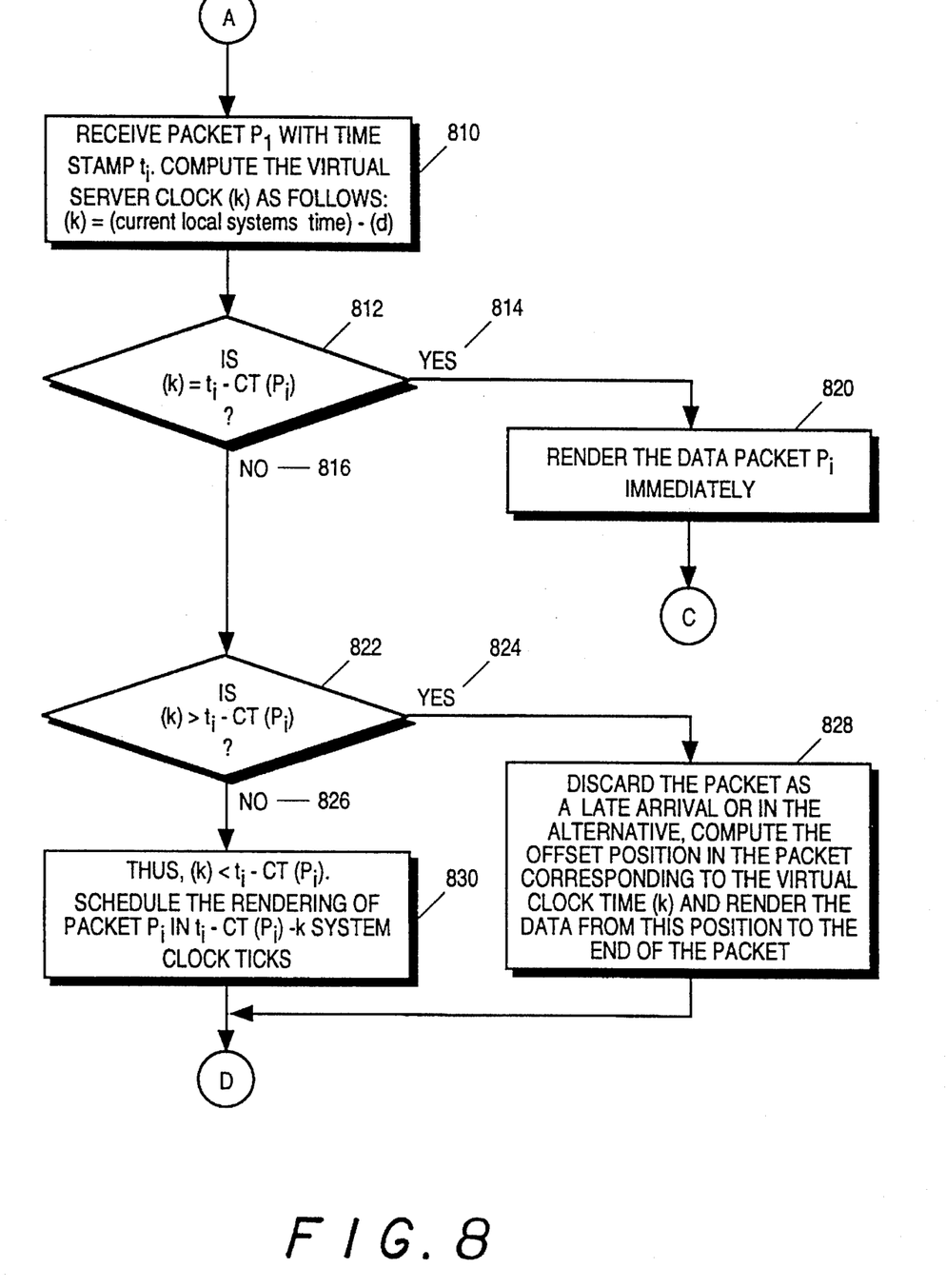
Figure 9:
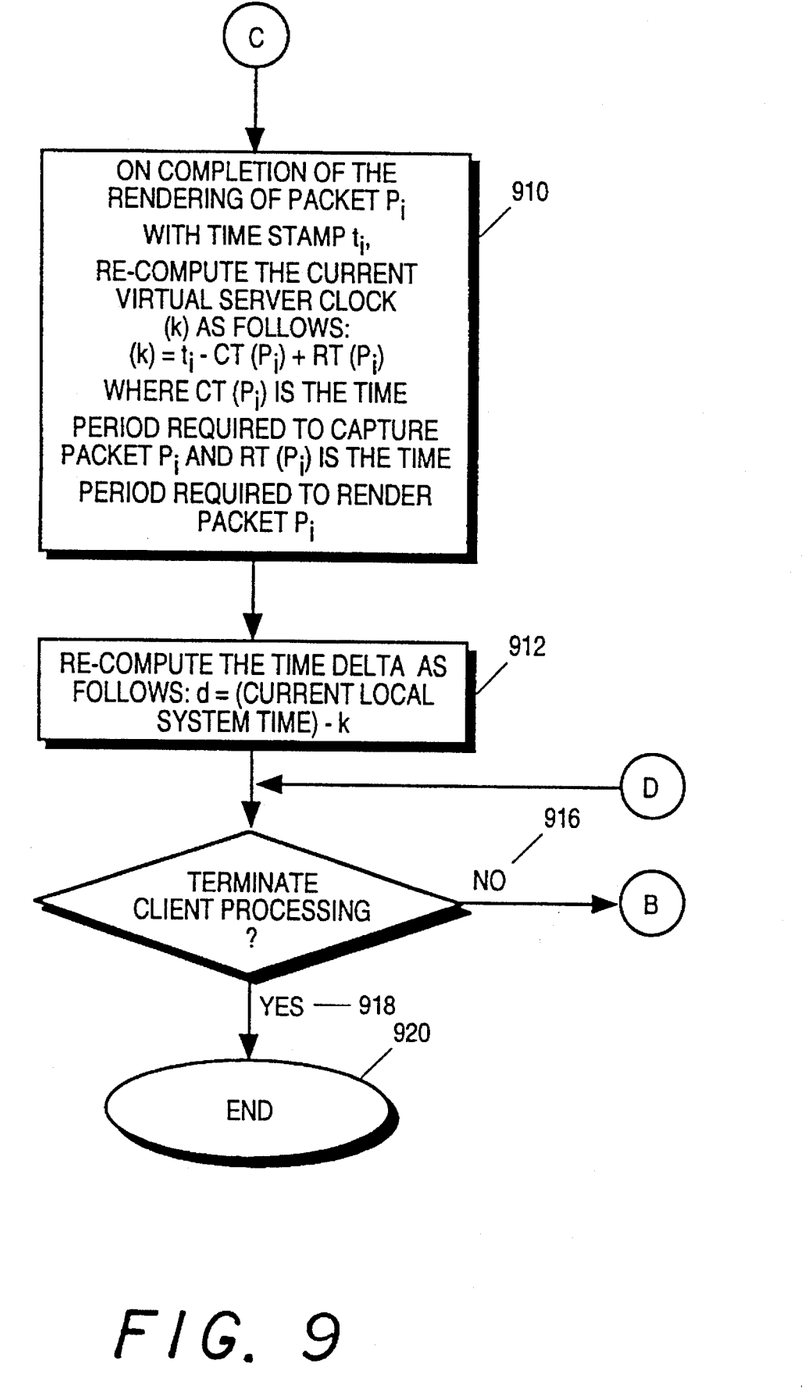

Referring now to FIGS. 7 through 9, the processing logic for the client system is illustrated. Referring now to FIG. 7, the client system receives a data packet in processing block 712. If this data packet is the first packet received by the client system for this data stream, processing path 718 is taken to processing block 720. Otherwise, processing path 716 is taken to the bubble labeled A and illustrated in FIG. 8.

In processing block 720, the time stamp $t_1$ is retrieved from the received first data packet. The virtual server clock or the initial position on the data stream time line (k) is computed in processing block 720. The value (k) is a variable residing in and maintained by the client system that represents the virtual clock of the server system. The variable (k) represents the value of the server system's clock at the current position in the rendered data stream. The value of (k) is initially set to the time stamp of the first data packet ($t_1$) less the capture time period of the first data packet of the data stream, CT ($P_1$). Another value (d) is computed in processing block 722. The variable (d) contains a time delta representing the difference between the client system clock and the virtual server system clock represented by the variable (k). The value of (d) is computed as the difference between the client's current local system time and the virtual server system clock (k). The values in variables (k) and (d) are used extensively during the synchronization process of the present invention as will be described in more detail below.

Once the initial processing for the first data packet is completed, the first data packet $P_1$ is rendered by the client's system in processing block 724. Rendering a data packet comprises extracting the capture data contained in the data packet and converting the data to a form suitable for transfer to an appropriate output device, such as a display device, a print device, an audio device, or other device compatible with the type of information contained in the data packet. Means and methods for rendering data from a data packet are well known to those of ordinary skill in the art.

On completion of the rendering step in processing block 724, processing control loops back to the top of the processing flow illustrated in FIG. 7 at the bubble labeled B. The next data packet is received in processing block 712. In this case, this data packet will not be the first data packet in the data stream. Therefore, processing path 716 is taken to the bubble labeled A illustrated in FIG. 8.

Referring now to FIG. 8, the capture system processing logic continues at the bubble labeled A. The next packet received in processing block 712 ($P_i$) contains time stamp $t_i$. The value of the virtual server clock (k) is computed in processing block 810. The virtual server clock (k) is set to the client current local system time less the time delta (d). The value of (k) now represents the current position on the data stream time line. The time stamp $t_i$ is used to determine where on this time line the received packet $P_i$ should be placed. The beginning capture time for packet $P_i$ is computed and used for this process. The beginning capture time of packet $P_i$ is the time stamp value $t_i$ less the capture time CT of packet $P_i$. If the virtual server clock (k) is equal to the starting capture time of packet $P_i$, processing path 814 is taken to processing block 820 where packet $P_i$ is immediately rendered. Processing for this packet then continues at the bubble labeled C illustrated in FIG. 9. If, however, the virtual server clock is not equal to the starting capture time of packet $P_i$, processing path 816 is taken to decision block 822. If the virtual server clock (k) is greater than the starting capture time of packet $P_i$, processing path 824 is taken to processing block 828. In this case, the current position in the data stream time line has already passed the position corresponding to this data packet. Thus, the packet $P_i$ is discarded as a late arrival.

In an alternative embodiment, a portion of a single packet is discarded while the remainder of the packet is rendered. The starting capture time of packet $P_i$ can be used to generate an offset into the packet that corresponds to the virtual sever clock time (k). If the number of samples in the packet is known or if the starting capture time of a subsequent packet is known, the offset into the current packet is generated as an interpolation of these values with the virtual server clock time (k). In this manner, the offset into the packet corresponding to (k) is computed. The portion of the packet $P_i$ from the starting capture time to the offset value is discarded. The portion of packet $P_i$ from the offset value to the and of the packet is rendered.

Processing then continues at the bubble labeled D illustrated in FIG. 9. If the virtual server clock is less than the start capture time of packet $P_i$, processing path 826 is taken to processing block 830 where the rendering of packet $P_i$ is scheduled for a future time corresponding to a number of client system clock ticks in advance of the current time. This future time is computed as a number of client system clock ticks equal to time stamp $t_i$ less the capture time CT of packet $P_i$ less virtual server clock value (k). Means and methods for scheduling the execution of an event at a particular time in a computer is well known to those of ordinary skill in the art. Processing for the client system continues at the bubble labeled D illustrated in FIG. 9.

Referring now to FIG. 9, client processing logic continues at the bubble labeled C. On completion of the rendering of packet $P_i$ with a time stamp $t_i$, the current virtual server clock (k) is recomputed in processing block 910. The value of the virtual server clock (k) is set to the time stamp $t_i$ less the capture time CT of packet $P_i$ plus the time required to render RT packet $P_i$. The time required to render a packet is represented by the function RT ($P_1$). The time delta (d) is recomputed in processing block 912. Time delta (d) is set to the client current local system time less the value of a virtual server clock (k). If client processing is selected to continue, processing path 916 is taken to the bubble labeled B illustrated in FIG. 7 where the next data packet of the data stream is received. If client processing is selected for termination, processing path 918 is taken and capture processing terminates at end bubble 920.

The process of the present invention described above maintains the virtual server clock (k) and ensures that data packets are rendered by the client system at the same time with respect to the virtual server clock as they were captured. The virtual server clock variable (k) is efficiently maintained in the present invention in that (k) is not updated on every local system clock tick. Rather, a time delta (d) is maintained as the difference between the client local system clock and the virtual server clock (k). Therefore, as the local system clock is updated, the virtual server clock (k) is also updated. The offset between the clocks is recalculated for each correctly rendered packet to avoid clock skew introduced if the local client clock runs slightly faster or slower than the server system clock.

The process of the present invention described above details an effective method of synchronization of a data stream arriving from one server. The same basic process may be used if there are multiple servers supplying data streams to a single client system. In one case, the streams from one server must be synchronized, but no synchronization is required between streams from different servers. In this case, the client system maintains a set of virtual clock offsets $d_1$ to $d_n$, one for each server. In addition, a virtual server clock value $k_i$ is maintained for each server system. When a data packet arrives from a particular server, that server's virtual clock, $k_i$, is calculated from the correct offset $d_i$. When a packet is finished rendering, the virtual clock offset $d_i$ for that particular server is updated in a manner similar to the process described above.

In some environments, it is necessary to mix a set of data streams into one unified stream for playback. For example, instead of two servers each sending an audio and video stream to a client for rendering, it may be more efficient to mix the audio into a unified stream which then must be synchronized with both video streams. In this case, the client system must maintain a set of virtual clock offsets for more than one server. The mixed audio stream must preserve the time stamps from all of the originating servers. Therefore, the time stamp of a packet in the mixed stream is a set of server identifiers and time stamp pairs. The decision to render a packet is now made as a consensus of whether the time stamps for each of the servers is ahead of or behind the virtual clock value for that server. A mixed data packet is scheduled for rendering at a time which satisfies one or more of the virtual clocks. When a mixed packet has been rendered, the virtual clock offsets for all of the servers contributing to the mixed packet are updated.

Thus, an apparatus and method for synchronizing multiple independent data streams in a networked computer system is disclosed. Although the present invention is described herein with reference to a specific preferred embodiment, many modifications and variations therein will readily occur to those of ordinary skill in the art. Accordingly, all such variations and modifications are included within the intended scope of the present invention as defined by the following claims.

I claim:

1. In a computer network having a plurality of computer systems coupled by a communication medium, one of said plurality of computer systems being a server system, a different one of said plurality of computer systems being a client system, a method for synchronizing a data stream transferred from said server system to said client system, said method comprising the steps of:

capturing information into a data packet, said capturing step being performed by said server system;

storing time information into said data packet, said time information indicating when said capturing step is complete;

transferring said data packet to said client system across said communication medium;

initializing a virtual server system clock if said data packet is a first data packet in said data stream, said initializing step including the step of computing a difference based on time information stamped on said first data packet and time information on a server system clock;

retrieving said time information from said data packet;

comparing said time information with said virtual server system clock; and processing said information in said data packet if said time information indicates a time equal to a time indicated by said virtual server system clock.

2. The method as claimed in claim 1 further including the step of:

discarding said data packet if said time information indicates a time earlier than a time indicated by said virtual server system clock.

3. The method as claimed in claim 1 further including the steps of:

calculating an index into said information in said data packet corresponding to a value in said virtual server system clock;

discarding a first portion of said data packet from a beginning position in said data packet to a position in said data packet indicated by said index; and processing a second portion of said data packet from a position in said data packet indicated by said index to an ending position of said data packet.

4. The method as claimed in claim 1 wherein said information captured in said data packet comprises either video or audio information.

5. The method of claim 1, wherein said step of computing of a difference based on a first data packet and time information on a server clock further comprises the steps of:

computing a value by subtracting the capture time period of said first data packet from the time information stamped on said first data packet; and subtracting said value from said server system clock.

6. In a computer network having a plurality of computer systems coupled by a communication medium, one of said plurality of computer systems being a server system, a different one of said plurality of computer systems being a client system, a method for synchronizing data streams transferred from said server system to said client system, said method comprising the steps of:

capturing information into a first set of data packets, said capturing step being performed by said server system;

capturing information into a second set of data packets, said capturing step being performed by said server system;

storing time information into said first set of data packets, said time information indicating when said capturing step is complete;

storing time information into said second set of data packets, said time information indicating when said capturing step is complete;

transferring said first set of data packets to said client system across said communication medium in a first data stream;

transferring said second set of data packets to said client system across said communication medium in a second data stream;

initializing a virtual server system clock if a data packet is a first data packet in a data stream, said initializing step includes computing a difference based on the time stamped on a reference data packet in a respective data stream and a time reading of a server clock;

retrieving said time information from data packets of said first set or said second set of data packets;

comparing said time information with said virtual server system clock; and processing said information from data packets of said first set or said second set of data packets if said time information indicates a time equal to a time indicated by said virtual server system clock.

7. The method as claimed in claim 6 further including the step of:

scheduling processing of said information from data packets of said first set or said second set of data packets if said time information indicates a time later than a time indicated by said virtual server system clock.

8. The method as claimed in claim 6 further including the step of:

discarding data packets of said first set or said second set of data packets if said time information indicates a time earlier than a time indicated by said virtual server system clock.

9. The method as claimed in claim 6 further including the steps of:

calculating an index into said information in data packets of said first set or said second set of data packets corresponding to a value in said virtual server system clock;

discarding a first portion of data packets of said first set or said second set of data packets from a beginning position in said data packets to a position in said data packets indicated by said index; and processing a second portion of data packets of said first set or said second set of data packets from a position in said data packets indicated by said index to an ending position of said data packets.

10. The method as claimed in claim 6 wherein said information captured in said first set of data packets comprises video information and said information captured in said second set of data packets comprises audio information.

11. The method of claim 6, wherein said step of computing of a difference based on a first data packet and time information on a server clock further comprises the steps of:

computing a value by subtracting the capture time period of said first data packet from the time information stamped on said first data packet; and subtracting said value from said server system clock.

12. In a computer network having a plurality of computer systems coupled by a communication medium, one of said plurality of computer systems being a server system, a different one of said plurality of computer systems being a client system, an apparatus for synchronizing a data stream transferred from said server system to said client system, said apparatus comprising:

means for capturing information into a data packet, said means for capturing residing in said server system;

means for storing time information into said data packet, said time information indicating when said capturing is finished;

means for transferring said data packet to said client system across said communication medium;

means for initializing a virtual server system clock if said data packet is a first data packet in said data stream by generating a difference based on a time stamped on said first data packet and a time reading on a server clock;

means for retrieving said time information from said data packet;

means for comparing said time information with said virtual server system clock; and means for processing said information in said data packet if said time information indicates a time equal to a time indicated by said virtual server system clock.

13. The apparatus as claimed in claim 12 further including:

means for scheduling processing of said information in said data packet if said time information indicates a time later than a time indicated by said virtual server system clock.

14. The apparatus as claimed in claim 12 further including:

means for discarding said data packet if said time information indicates a time earlier than a time indicated by said virtual server system clock.

15. The apparatus as claimed in claim 12 further including:

means for calculating an index into said information in said data packet corresponding to a value in said virtual server system clock;

means for discarding a first portion of said data packet from a beginning position in said data packet to a position in said data packet indicated by said index; and means for processing a second portion of said data packet from a position in said data packet indicated by said index to an ending position of said data packet.

16. The apparatus as claimed in claim 12 wherein said information captured in said data packet comprises either video or audio information.

17. In a computer network having a plurality of computer systems coupled by a communication medium, one of said plurality of computer systems being a server system, a different one of said plurality of computer systems being a client system, an apparatus for synchronizing data streams transferred from said server system to said client system, said apparatus comprising:

means for capturing information into a first set of data packets, said means for capturing residing in said server system;

means for capturing information into a second set of data packets, said means for capturing residing in said server system;

means for storing time information into said first set of data packets, said time information indicating when said capturing is finished;

means for storing time information into said second set of data packets, said time information indicating when said capturing is finished;

means for transferring said first set of data packets to said client system across said communication medium in a first data stream;

means for transferring said second set of data packets to said client system across said communication medium in a second data stream;

means for initializing a virtual server system clock if a data packet is a first data packet in a data stream by generating a difference based on a time stamped on a reference data packet and time information on a server clock;

means for retrieving said time information from data packets of said first set or said second set of data packets;

means for comparing said time information with said virtual server system clock; and means for processing said information from data packets of said first set or said second set of data packets if said time information indicates a time equal to a time indicated by said virtual server system clock.

18. The apparatus as claimed in claim 17 further including:

means for scheduling processing of said information from data packets of said first set or said second set of data packets if said time information indicates a time later than a time indicated by said virtual server system clock.

19. The apparatus as claimed in claim 17 further including:

means for discarding data packets of said first set or said second set of data packets if said time information indicates a time earlier than a time indicated by said virtual server system clock.

20. The apparatus as claimed in claim 17 further including:

means for calculating an index into said information in data packets of said first set or said second set of data packets corresponding to a value in said virtual server system clock;

means for discarding a first portion of data packets of said first set or said second set of data packets from a beginning position in said data packets to a position in said data packets indicated by said index; and means for processing a second portion of data packets of said first set or said second set of data packets from a position in said data packets indicated by said index to an ending position of said data packets.

21. The apparatus as claimed in claim 17 wherein said information captured in said first set of data packets comprises video information and said information captured in said second set of data packets comprises audio information.

22. In a computer network having a plurality of computer systems coupled by a communication medium, one of said plurality of computer systems being a server system, a different one of said plurality of computer systems being a client system, a method for synchronizing a data stream transferred from said server system to said client system, said method comprising the steps of:

capturing information into a data packet, said capturing step being performed by said server system;

storing time information into said data packet, said time information indicating when said capturing step is complete;

transferring said data packet to said client system across said communication medium;

initializing a virtual server system clock if said data packet is a first data packet in said data stream;

retrieving said time information from said data packet;

comparing said time information with said virtual server system clock;

processing said information in said data packet if said time information indicates a time equal to a time indicated by said virtual server system clock;

calculating an index into said information in said data packet corresponding to a value in said virtual server system clock;

discarding a first portion of said data packet from a beginning position in said data packet to a position in said data packet indicated by said index; and processing a second portion of said data packet from a position in said data packet indicated by said index to an ending position of said data packet.

23. In a computer network having a plurality of computer systems coupled by a communication medium, one of said plurality of computer systems being a server system, a different one of said plurality of computer systems being a client system, a method for synchronizing a data stream transferred from said server system to said client system, said method comprising the steps of:

capturing information into a data packet, said capturing step being performed by said server system;

storing time information into said data packet, said time information indicating when said capturing step is complete;

transferring said data packet to said client system across said communication medium;

initializing a virtual server system clock if said data packet is a first data packet in said data stream;

retrieving said time information from said data packet;

comparing said time information with said virtual server system clock;

processing said information in said data packet if said time information indicates a time equal to a time indicated by said virtual server system clock; and scheduling processing of said information in said data packet if said time information indicates a time later than a time indicated by said virtual server system clock.

* * * * *